(12) United States Patent
Purohit et al.

(10) Patent No.: US 7,791,232 B2
(45) Date of Patent: Sep. 7, 2010

(54) POWER TOOL HAVING AN ELECTRONICALLY COMMUTATED MOTOR AND DOUBLE INSULATION

(75) Inventors: Madhur M. Purohit, Towson, MD (US); Earl M. Ortt, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 259 days.

(21) Appl. No.: 12/114,211

(22) Filed: May 2, 2008

(65) Prior Publication Data

US 2009/0275273 A1 Nov. 5, 2009

(51) Int. Cl.
*H02K 11/00* (2006.01)
(52) U.S. Cl. ........................ 310/68 B; 310/50
(58) Field of Classification Search ............ 310/50, 310/68 R, 68 B
See application file for complete search history.

(56) References Cited

U.S. PATENT DOCUMENTS

| 6,680,553 | B1 * | 1/2004 | Takano ............... 310/68 B |
| 6,693,422 | B2 * | 2/2004 | Lutz ................. 324/207.2 |
| 7,193,343 | B2 * | 3/2007 | Tsuge et al. .......... 310/68 B |
| 7,589,443 | B2 * | 9/2009 | Kataoka et al. ....... 310/68 B |
| 2006/0125334 | A1 * | 6/2006 | Kataoka et al. ....... 310/68 B |

* cited by examiner

*Primary Examiner*—Nguyen N Hanh
(74) *Attorney, Agent, or Firm*—Harness, Dickey & Pierce, P.L.C.

(57) ABSTRACT

A power tool has a housing a housing having an electronically commutated motor disposed therein. The motor has a rotor and a stator. The rotor has permanent magnets. The stator has a lamination stack and windings wound therein. Features are provided to provide double insulation.

15 Claims, 11 Drawing Sheets

POWER TOOL HAVING AN ELECTRONICALLY COMMUTATED MOTOR AND DOUBLE INSULATION

FIELD

The present invention relates to power tools, and more particularly to a power tool having a brushless motor with double insulation.

BACKGROUND

A variety of different types of power tools have electric motors. By way of example and not of limitation, these power tools include drills, hammer drills, saws, sanders, grinders, impact wrenches, and the like.

Orbital sanders, such as random orbital sanders, are used in a variety of applications where it is desirable to obtain an extremely smooth surface free of scratches and swirl marks. Such applications typically involve wood working applications such as furniture construction or vehicle body repair applications, just to name a few.

Random orbital sanders typically include a platen that is driven rotationally by a motor-driven spindle. The platen is driven via a freely rotatable bearing that is eccentrically mounted on the end of the drive spindle. Rotation of the drive spindle causes the platen to orbit about the drive spindle while frictional forces within the bearing, as well as varying frictional loads on the sanding disc attached to the platen, cause the platen to also rotate about the eccentric bearing, thereby imparting the "random" orbital movement to the platen. Typically such random orbit sanders also include a fan member which is driven by the output shaft of the motor. The fan member is adapted to draw dust and debris generated by the sanding action up through openings formed in the platen and into a filter or other like dust collecting receptacle.

One such prior art random orbital sander is disclosed in U.S. Pat. No. 5,392,568 for Random Orbit Sander Having Braking Member (the entire disclosure of which is incorporated herein by reference). For context, a short section of the '568 patent describing a random orbital sander is repeated here. With reference to FIG. 1, a random orbital sander 10 generally includes a housing 12 which includes a two-piece upper housing section 13 and a two-piece shroud 14 at a lower end thereof. Removably secured to the shroud 14 is a dust canister 16 for collecting dust and other particulate matter generated by the sander during use. A platen 18 having a piece of sandpaper 19 (FIG. 2) releasably adhered thereto is disposed beneath the shroud 14. The platen 18 is adapted to be driven rotationally and in a random orbital pattern by a motor disposed within the upper housing 13. The motor (shown in FIG. 2) is turned on and off by a suitable on/off switch 20 which can be controlled easily with a finger of one hand while grasping the upper end portion 22 of the sander. The upper end portion 22 further includes an opening 24 formed circumferentially opposite that of the switch 20 through which a power cord 26 extends.

The shroud 14 is preferably rotatably coupled to the upper housing section 13 so that the shroud 14, and hence the position of the dust canister 16, can be adjusted for the convenience of the operator. The shroud section 14 further includes a plurality of openings 28 (only one of which is visible in FIG. 1) for allowing a cooling fan driven by the motor within the sander to expel air drawn into and along the interior area of the housing 12 to help cool the motor.

With reference now to FIG. 2, the motor can be seen and is designated generally by reference numeral 30. The motor 30 includes an armature 32 having an output shaft 34 associated therewith. The output shaft or drive spindle 34 is coupled to a combined motor cooling and dust collection fan 36. In particular, fan 36 comprises a disc-shaped member having impeller blades formed on both its top and bottom surfaces. The impeller blades 36a formed on the top surface serve as the cooling fan for the motor, and the impeller blades 36b formed on the bottom surface serve as the dust collection fan for the dust collection system. Openings 18a formed in the platen 18 allow the fan 36b to draw sanding dust up through aligned openings 19a in the sandpaper 19 into the dust canister 16 to thus help keep the work surface clear of sanding dust. The platen 18 is secured to a bearing retainer 40 via a plurality of threaded screws 38 (only one of which is visible in FIG. 8) which extend through openings 18b in the platen 18. The bearing retainer 40 carries a bearing 42 that is journalled to an eccentric arbor 36c formed on the bottom of the fan member 36. The bearing assembly is secured to the arbor 36c via a threaded screw 44 and a washer 46. It will be noted that the bearing 42 is disposed eccentrically to the output shaft 34 of the motor, which thus imparts an orbital motion to the platen 18 as the platen 18 is driven rotationally by the motor 30.

One disadvantage the electrically powered random orbital sanders have compared to pneumatic sanders is due to the height of the sander. Heretofore, electrically powered random orbital sanders and orbital sanders have used mechanically commutated motors, such as universal series motors in the case of corded sanders, which dictates that the overall height of the electrically powered sander is greater than a comparable pneumatic sander. In electrically powered random orbital sanders, if the user grasps the sander by placing the palm of the user's hand over the top of the sander, the user's hand is sufficiently far from the work that the user is sanding to cause more fatigue than is the case with pneumatic sanders where the user can grasp the sander close to the work piece. This often leads to user's grasping electrically powered random orbital sanders on the side of the sander. This tends to be awkward compared to grasping the top of the housing. Also, the greater height of the electrically powered random orbital sander causes more wobble compared to the lower height pneumatic random orbital sander. The electrically powered sander is heavier than a comparable pneumatic sander due to the weight of the motor, further contributing to the wobble problem. The user of the electrically powered random orbital sander thus must grasp it more tightly than the lower height and weight pneumatic random orbital sander, causing additional fatigue in the user's hand.

SUMMARY

A power tool has a housing having an electronically commutated motor disposed therein. The motor has a rotor and a stator. The rotor has permanent magnets disposed around a periphery of the rotor and a shaft. The stator has a lamination stack and windings wound therein. In an aspect, a sense magnet tray is affixed to the shaft of the rotor in proximity to a sensor disposed in the housing. The sensor is axially spaced from the sense magnet tray. A sense magnet is affixed to the sense magnet tray. The sense magnet tray has a circumferential skirt that extends around an outer edge of the sense magnet. The sense magnet tray has circumferential skirt having a height at least equal to a height of the sense magnet. A shortest uninsulated path between the sense magnet and a closest conductive part of the rotor is along a serpentine path that runs from the sense magnet, along an outer side of the sense magnet tray circumferential skirt and along a bottom of the sense magnet tray.

In an aspect, an upper bearing bridge extends across a top of the stator. The upper bearing bridge has a bearing pocket in which an upper bearing on the rotor shaft is received. The upper bearing bridge includes an annular skirt made of electrically insulative material that extends from a periphery of the bearing pocket toward the sense magnet tray. A shortest uninsulated path between any live component of a circuit board on which the sensor is mounted and the upper bearing is along a serpentine path that extends from the circuit board along an outer surface of the annular skirt.

In an aspect, the rotor includes an electrically insulative sleeve disposed around the permanent magnets. The sleeve has opposed axial ends that extend beyond respective opposed axial ends of the permanent magnets. A shortest uninsulated path between the stator lamination stack and a closest conductive part of the rotor is around an axial end of the insulative sleeve.

In an aspect, electrically insulative shields are disposed at radially inner sides of the stator windings that have opposed axial ends that extend beyond respective opposed axial ends of the stator windings.

In an aspect, a lower bearing bridge includes a lower bearing retainer made of an electrically insulative material. The lower bearing retainer is affixed to the lower bearing bridge by at least one screw extending through a screw hole in the lower bearing retainer wherein a head of the screw is recessed in a screw pocket in the lower bearing bridge with a top surface of the screw head below a top surface of the upper bearing bridge. A shortest uninsulated path from the stator windings to the screw head is along a serpentine path along an outer surface of one of the insulative shields, the top surface of the lower bearing retainer and into the screw pocket.

In an aspect, the rotor is overmolded with an overmold of material that is electrically insulative. The overmold includes a sense magnet tray formed therein when the overmold material is molded. The overmold material surrounds the permanent magnets and affixes them in place.

In an aspect, a yoke of ferromagnetic material is disposed in the sense tray with the sense magnet disposed on top of the yoke. The sense magnet is made of ferrite.

In an aspect the sense magnet is a multi-pole ring magnet.

In an aspect, the sense magnets includes a plurality of magnets. In an aspect, a method of making a power tool includes placing a rotor with a sense magnet thereon in a mold and injection molding magnet material into the sense magnet tray to form a sense magnet. In an aspect, molding magnetic material includes molding NdFeB material to form the sense magnet in the sense magnet tray and a yoke of ferromagnetic material is not provided in the sense magnet tray.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
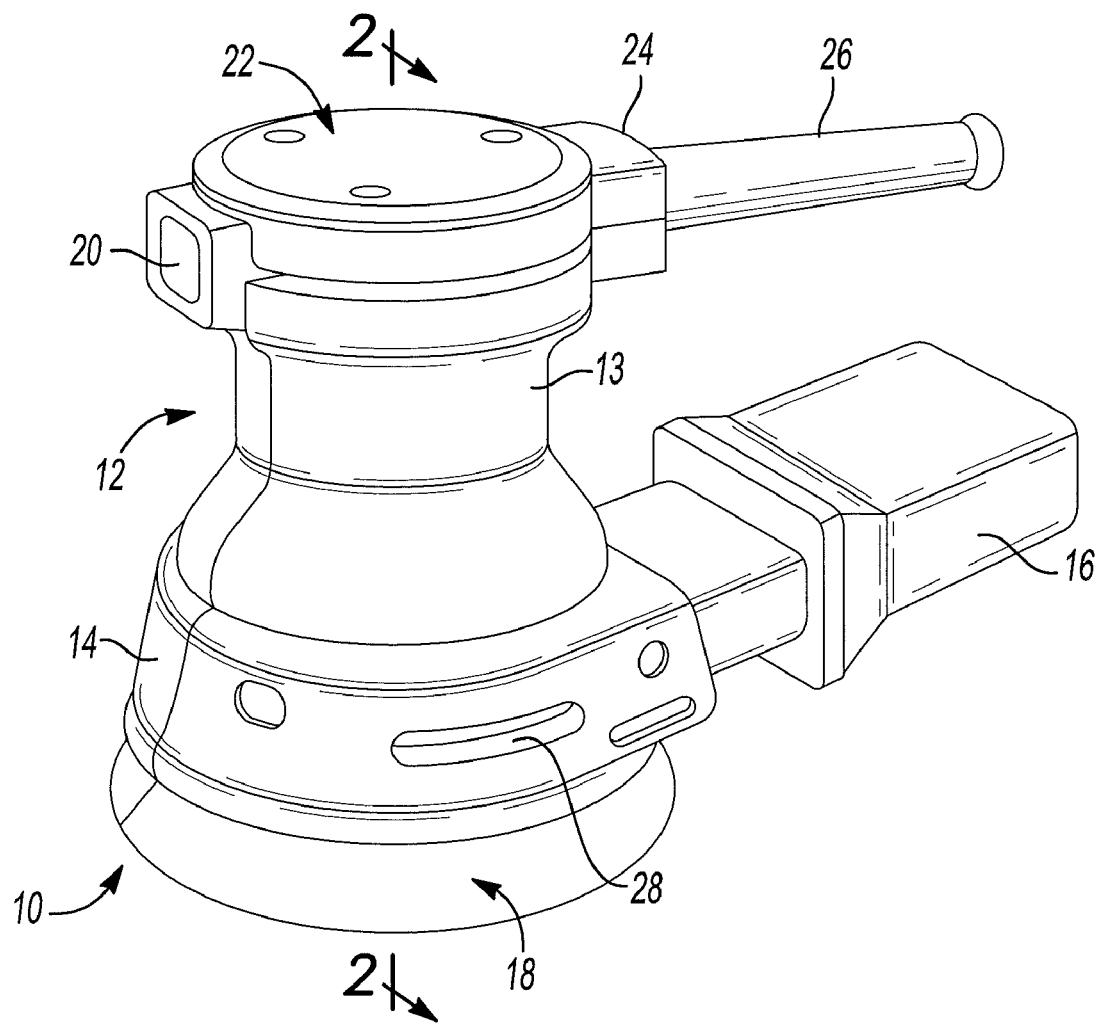
FIG. 1 is a perspective view of a prior art random orbital sander.
Figure 2:
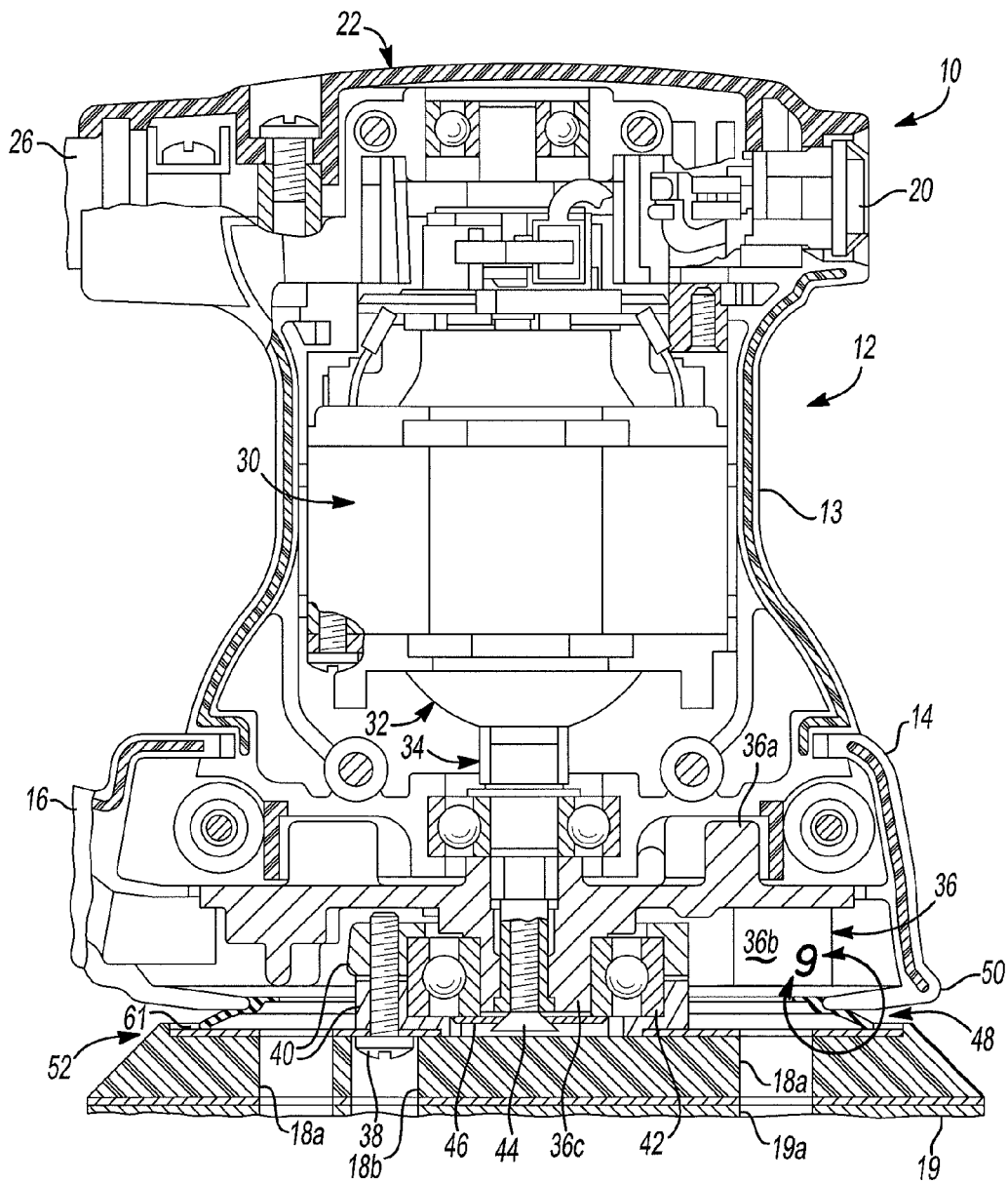
FIG. 2 is a cross-sectional view of the sander of FIG. 2 taken along the line 2-2.

The following description is merely exemplary in nature and is in no way intended to limit the invention, its application, or uses. It should be understood that throughout the drawings, corresponding reference numerals indicate like or corresponding parts and features.

Referring to FIGS. 2-5, a low profile power tool 100 is shown. Low profile power tool 100 will be described in the context of a random orbital sander and will be referred to as sander 100, but it should be understood that it can be other types of power tools where holding the power tool near where it contacts the work piece would be advantageous, such as orbital sanders (which are sometimes known as "quarter sheet" sanders").

Sander 100 includes a housing 102 and an orbit mechanism 104 disposed beneath housing 102. A dust canister 106 may illustratively be removably secured to housing 102. Orbit mechanism 104 and dust canister 106 may illustratively be conventional orbit mechanisms and dust canisters that have been used on prior art orbital sanders, such as disclosed in the above referenced U.S. Pat. No. 5,392,568 (the entirety of which is incorporated herein by reference). Orbit mechanism 104 includes a pad or platen 108 to which a piece of sandpaper 110 can be releasably adhered.

Orbit mechanism 104 is adapted to be driven rotationally and in a random orbital pattern by a motor 112 disposed within housing 102. Motor 112 is turned on and off by a suitable on/off switch 114. Variable speed of motor 112 may illustratively be provided by a trigger switch 116, illustratively having a speed potentiometer 406 (FIG. 4). Trigger switch 116 may illustratively be a paddle switch illustratively having a paddle type actuator member 117 shaped generally to conform to a palm of a user's hand. Trigger switch 116 may be referred to herein as paddle switch 116. It should be understood, however, that paddle switch 116 could also include on/off switch 114. In the embodiments shown in FIGS. 2-5, sander 100 is illustratively a corded sander, that is, powered by being connected to AC mains, and a power cord 118 extends out through a hole 120 in housing 102.

A top 103 of housing 102 is shaped to provide an ergonomic palm grip 107 for the user to grasp. Top 103 is shaped to have an arcuate cross-section that generally conforms with a palm of a user's hand, with edges 105 curving back to housing 102, which necks down beneath edges 105. A user can thus grip sander 100 by holding the top 103 of sander 100 in the palm of the user's hand and grasping edges 105 with the user's fingers which can extend under edges 105. While palm grip 107 of sander 100 is shown in FIGS. 2-5 as being generally round (when viewed from the top), it should be understood that palm grip 107 can have other shapes, such as oval, teardrop, elliptical, or the like. Palm grip 107 allows the user to keep the user's hand more open when grasping sander 100. The low profile of sander 100, discussed below, cooperates with palm grip 107 to allow the user to grasp the sander 100 more lightly compared to prior art corded random orbital and orbital sanders and thus helps prevent the user's fingers from cramping. Also, the height of housing 102 is sufficient to allow the user to grasp sander 100 from the side if so desired.

In an embodiment, sander 100 may include a mechanical braking member, such as brake member 48 and corresponding ring 61 (shown in phantom in FIG. 3) of the type described in U.S. Pat. No. 5,392,568.

Motor 112 is preferably an electronically commutated motor having a rotor 200 (FIG. 2) with an output shaft 300 (FIG. 3) associated therewith to which orbit mechanism 104 is coupled in conventional fashion, such as disclosed in U.S. Pat. No. 5,392,568. Motor 112 may be an electronically commutated motor of the type known as brushless DC motors (which is somewhat of a misnomer as the electronic commutation generates AC waveforms, when viewed over a full turn of the motor, that excite the motor). Motor 112 may also be an electronically commutated motor of the type known as AC synchronous motors which are excited with sinusoidal waveforms.

Figure 7:
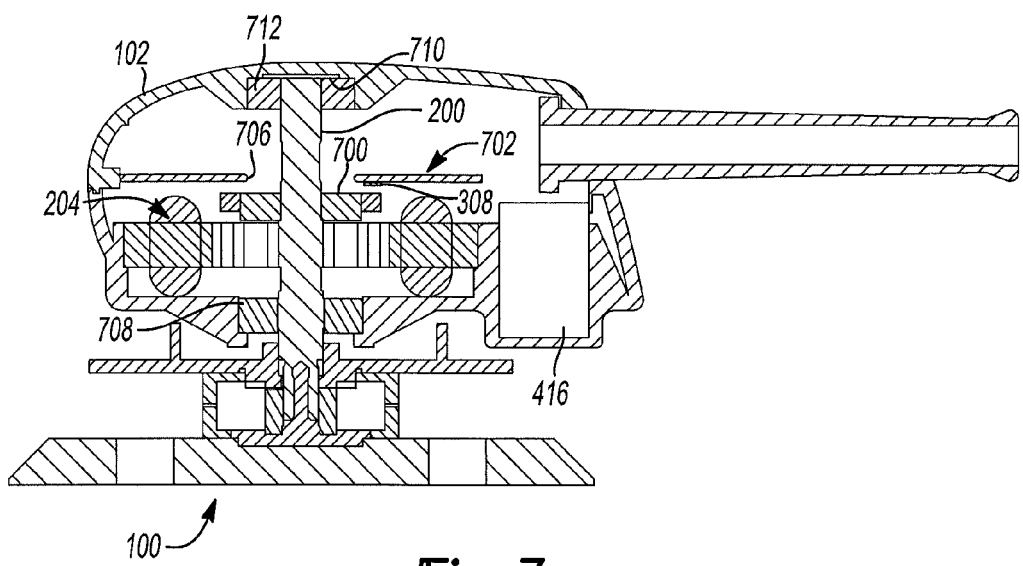
FIG. 7 is a side cross-section of the sander of FIG. 3.

As is known, motor power for an electronically commutated motor, for a given electrical and magnetic load, is determined by $D^2L$ where D is the diameter of the motor and L is the height of the laminations of the stator. Motor 112 also has a stator 202 having a plurality of windings 204 wound about lamination stack or stacks 302. (Lamination stack(s) 302 are formed in conventional fashion and may be a single stack or a plurality of stacks.) Rotor 200 includes a plurality of magnets 304 disposed around its periphery 206. Position sensors 308 (FIG. 7) are mounted in housing 102 about rotor 200. Position sensors 308 may illustratively be Hall Effect sensors with three position sensors spaced 120 degrees about rotor 200.

Motor 112 is a low profile or "pancake" style motor. That is, the diameter of motor 112 is large compared to the height of lamination stacks 302. The height of windings 204 are also kept low keeping the overall height or length of motor 112 low. As used herein, a motor is considered "low profile" if it has a diameter to lamination stack height ratio of at least 2:1 and the diameter of the motor is greater than the height or length of the motor. In an embodiment, motor 112 has a diameter to lamination height ratio of greater than five. Also, by using an electronically commutated motor as motor 112, the weight of motor 112 is significantly less for a given power compared to mechanically commutated motors, such as universal series motors. The rotor 200 of electronically commutated motor 112 having a rated power output of 200 watts has a weight of about 30 grams. The armature of a universal series motor having a rated power output of 120 watts has a weight of about 190 grams. Assuming a weight of approximately 50 grams for the electronics that controls the electronically commutated motor, the electronically commutated motor still weighs significantly less than a universal motor having comparable power. Additionally, electronically commutated motors are quieter than universal series motors due to the elimination of the mechanical commutator. However, it should be understood that motor 112 is not limited to electronically commutated motors and can be any motor that can be constructed with a low profile. In addition to electronically commutated motors, switched reluctance motors, induction motors, brush DC motors, axial permanent magnet motors (brush and brushless), and flux switching motors could be used for motor 112. Motor 112 may illustratively have a rated power output of at least 40 watts.

As mentioned, the sander 100 may preferably be a random orbital sander or orbital sander. Random orbital sanders and orbital sanders are typically used to sand larger surfaces, with smaller sanders known as "detail" sanders which are used to sand smaller surfaces. As such, platen 108 when used in a random orbital sander would typically have a diameter of five or six inches. (Random orbital sanders having a five inch diameter platen and random orbital sanders having a six inch diameter platen are the most commonly sold random orbital sanders.) Orbital sanders typically have a rectangular platen, with typical widths of five or six inches. Motor 112 may illustratively have at least 70 watts of power with a diameter to lamination height ratio of at least 2:1 for a sander having a five inch platen, and preferably at least 120 watts of power and a diameter to lamination height ratio of at least 3:1. Motor 112 may illustratively have at least 100 watts of power with a diameter to lamination height ratio of at least 2:1 for a sander having a six inch platen, and may illustratively have at least 120 watts of power and a diameter to lamination height ratio of at least 3:1. In an embodiment, motor 112 may illustratively have at least 200 watts of power with a diameter to lamination height ratio of at least 3:1.

Using a low profile motor, such as motor 112 described above, in sander 100 allows sander 100 to have a "low profile." As used herein, a corded sander is "low profile" if it has a diameter of palm grip 107 to sander 100 height ratio of at least 0.4:1, and preferably at least 0.6:1 or greater, such as 1:1, where the maximum height of sander 100 does not exceed 120 mm for a corded sander.

Figure 3:
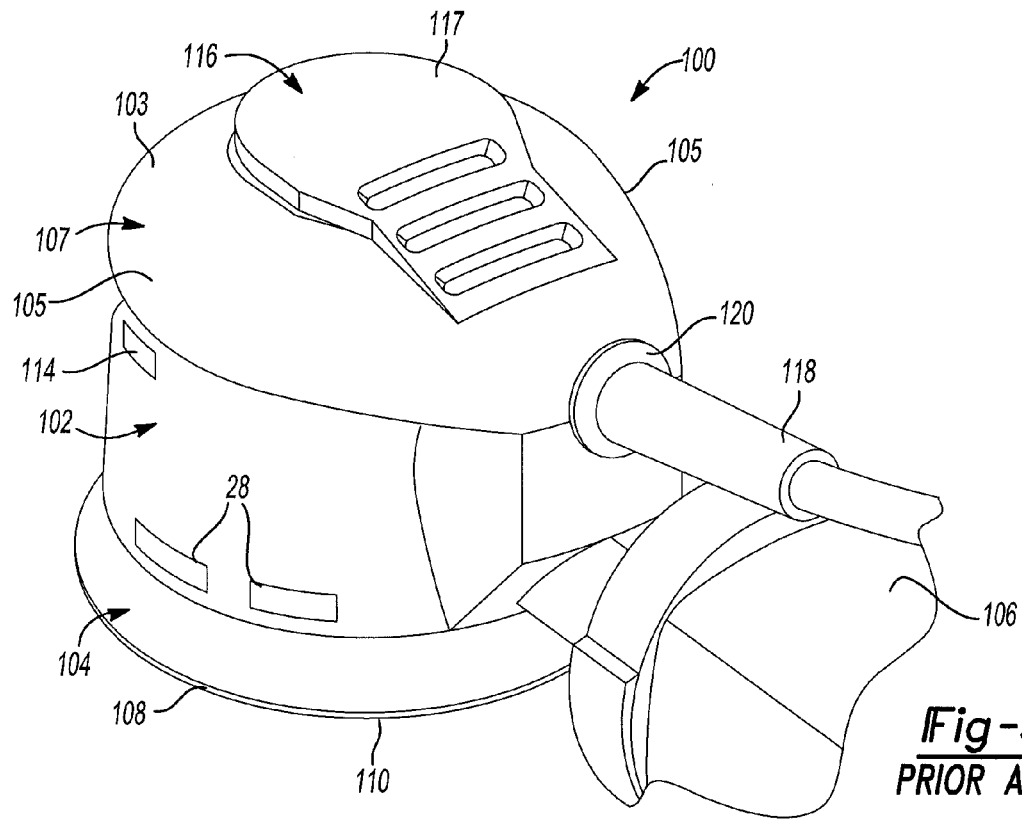
FIG. 3 is a perspective view of a prior art electrically powered random orbital sander.
Figure 4:
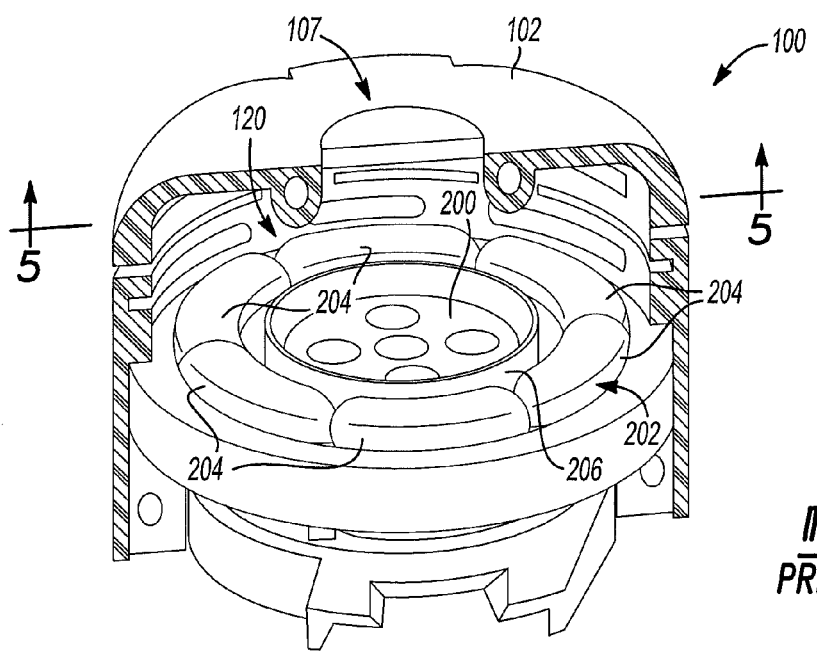
FIG. 4 is a perspective view, partially broken away, of the sander of FIG. 1.
Figure 5:
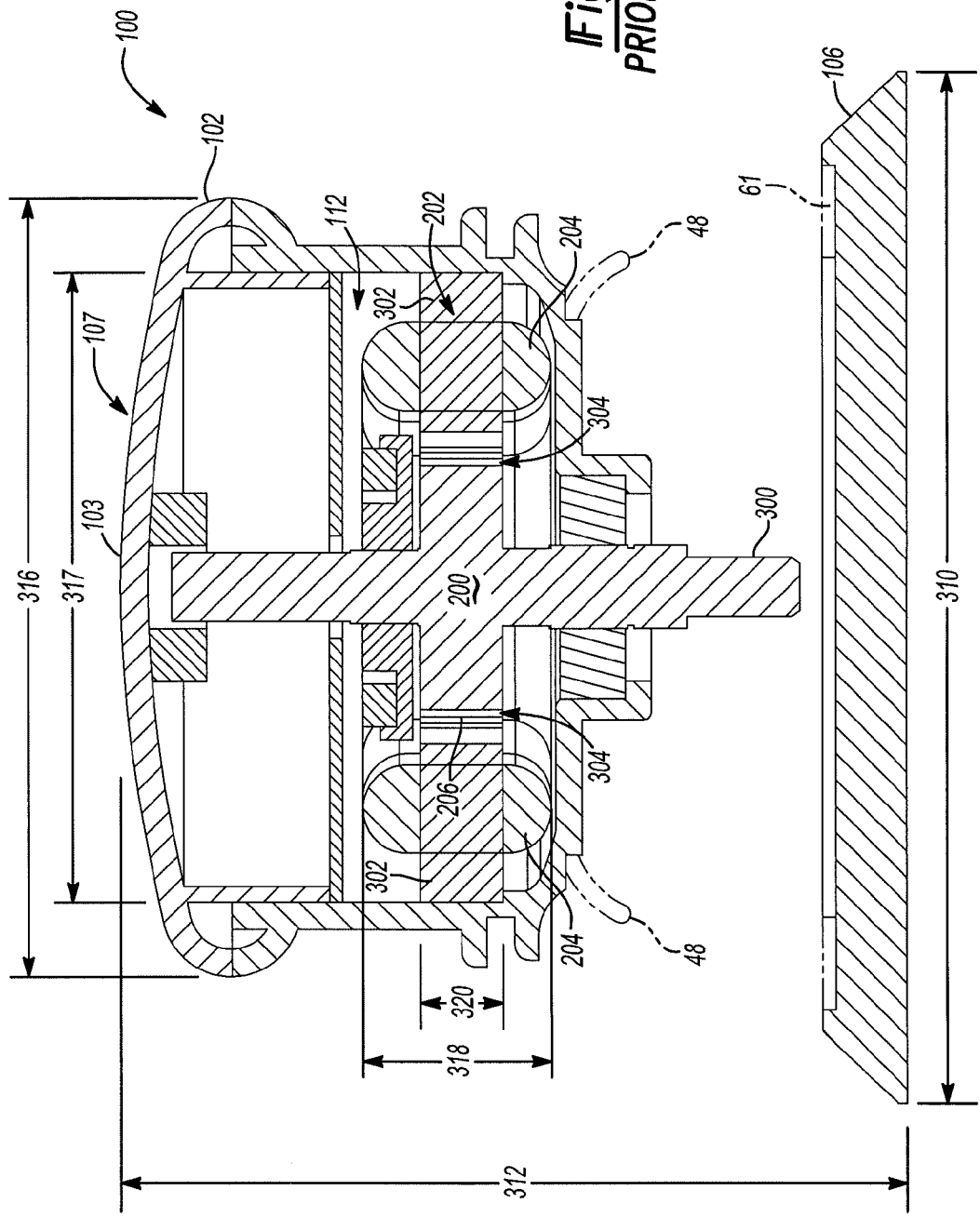
FIG. 5 is a cross-section view of the sander of FIG. 4 taken along the line 5-5.

With reference to FIG. 3, the diameter 310 of platen 108 of the illustrative low profile random orbital corded sander 100 is six inches (152.4 mm), the height 312 of sander 100 is 95 mm and the outside diameter 316 of top 103 of sander 100 (and thus of palm grip 107) is 90 mm. Magnets 304 are illustratively high powered rare earth magnets. The motor 112 has a rated power output of up to 200 watts with a diameter 317 of 75 mm and stack height (height of lamination stack 302) of 10 mm, giving motor 112 a diameter to lamination height ratio of 7.5:1. Motor 112 has an overall height 318 of 23 mm (illustratively determined by the height of windings 204). The diameter of palm grip 107 may illustratively range from 30 to 90 mm, and more preferably, from 70 to 90 mm, with the height of sander 100 not exceeding 120 mm as mentioned above. In an embodiment, the height of sander 100 is a maximum of 90 mm, the diameter of palm grip 107 is a maximum of 90 mm, and motor 112 has a rated power output of at least 120 watts. In a variation, the height of sander 100 is a maximum of 100 mm.

It should be understood that magnets 304 may illustratively be ferrite magnets or low powered bonded Neodymium magnets, in which event, motor 112 would have a lower rated power. Using ferrite magnets for magnets 304 would result in a decrease in rated power for motor 112, having the same dimensions, of about 50% and using low powered bonded Neodymium magnets for magnets 304 would result in a decrease in rated power for motor 112 of about 25%.

In an embodiment, motor 112 would have an illustrative rated power of at least 70 watts and a diameter to stack height ratio of 2:1. In another embodiment, motor 112 would have an illustrative rated power of at least 150 watts and a diameter to stack height ratio of 5:1.

As mentioned, palm grip 107 can have shapes other than round shapes. In such cases, the diameter of the palm grip for the purposes of the palm grip diameter to sander height ratio is the minor diameter of the palm grip.

The low profile aspect of sander 100 as mentioned reduces wobble compared to prior art corded sanders. Since weight is often added to the fan used in random orbital sanders and orbital sanders, such as fan 36 (FIG. 2), to counteract wobble, the weight of the fan can be reduced. For example, the weight of fan 36 in the prior art random orbital sander 10 having a five or six inch diameter platen 108 would illustratively be in the range of 100-200 grams. This weight could be reduced to about 70-120 grams in low profile sander 100. However, the weight of low profile sander 100 would illustratively be kept high enough to prevent "bouncing" when low profile sander 100 is applied to the workpiece. Illustratively, the weight of sander 100 would be in the 800 grams to 1400 grams range where sander 100 has a five or six inch diameter platen 108. This is comparable to the weight of prior art random orbital and orbital sanders as it is desirable that sander 100 have sufficient weight that that the sander 100 itself applies the needed pressure to urge the sander against the workpiece when sanding as opposed to the user applying pressure to sander 100. The user then need only guide the sander 100 on the workpiece, or need only apply light pressure to the sander 100. But by being able to reduce the weight of the fan in sander 100, the weight eliminated from the fan can be more optimally distributed in sander 100, or all or a portion of it eliminated from sander 100. Also, even if the weight of the fan is kept the same, the weight can be distributed in the fan to optimize performance aspects of sander 100 other than to counteract wobble, or at least to the degree needed in prior art sanders.

As mentioned, motor 112 may illustratively be an electronically commutated motor that is electronically commutated in conventional fashion using known electronically commutated motor control systems. These control systems can be adapted to provide additional functionality, as discussed with reference to FIG. 4.

Figure 6:
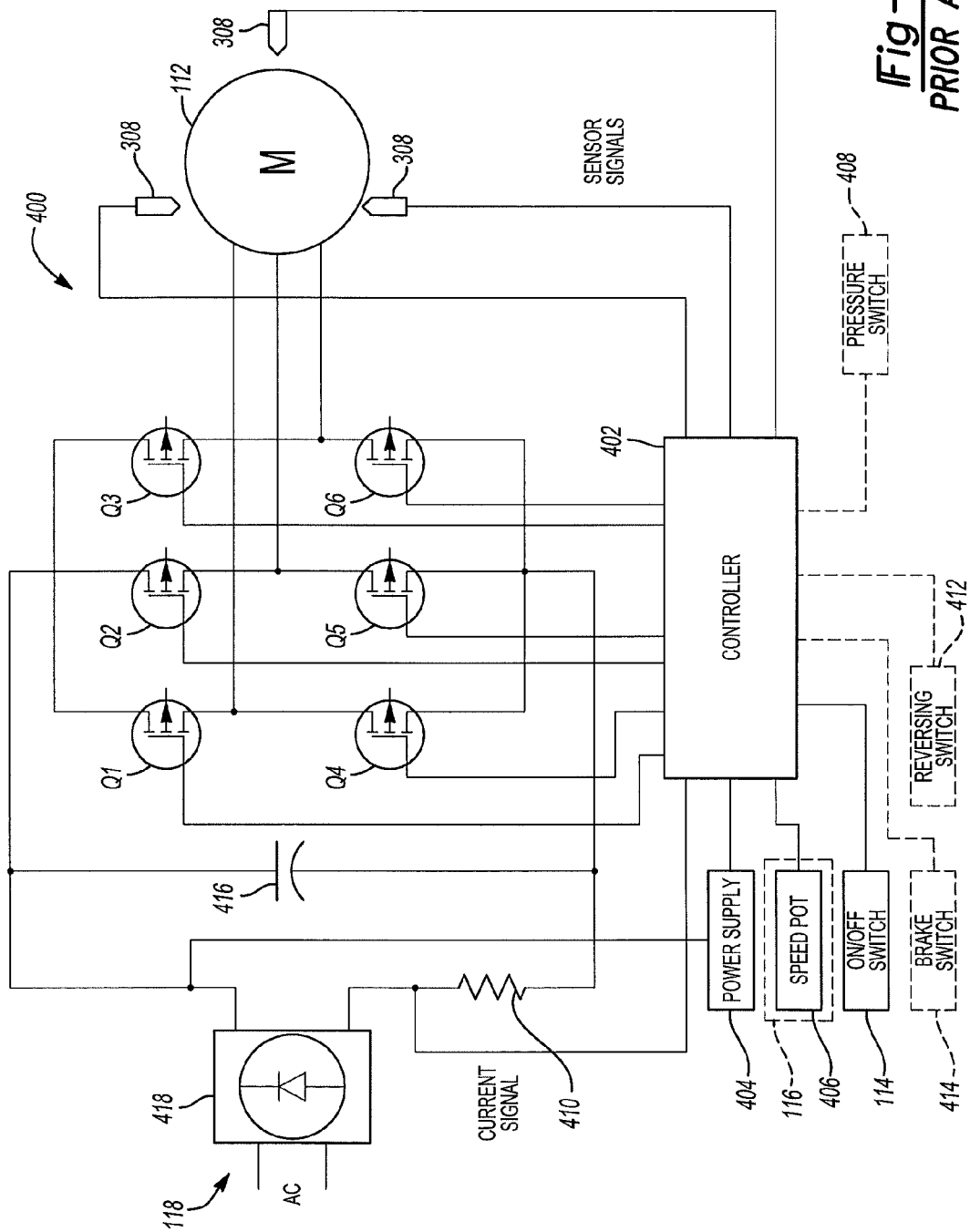
FIG. 6 is a schematic of a control system for an electronically commutated motor of the sander of FIGS. 3-5.

FIG. 6 shows an electronic motor commutation control system 400 for controlling motor 112. Control system 400 includes switching semi-conductors Q1-Q6 having their control inputs coupled to outputs of an electronic motor commutation controller (also known as a brushless DC motor controller) 402. Control system 400 includes a power supply 404 coupled to power cord 118 that provides DC power to controller 402 via rectifier 418. A filter or smoothing capacitor 416 smoothes the output of rectifier 418. Switch 114 is coupled to an input of controller 402 as is speed potentiometer 406 of paddle switch 116. As mentioned above, switch 114 and paddle switch 116 may be separate switch devices or included in the same switch device.

A matrix consisting of motor speed and/or current information is used by controller 402 to determine the PWM duty cycle at which it switches Q1-Q6, which in turn controls the speed of motor 112. The setting of speed potentiometer 406, which may illustratively be determined by how far actuator member 117 of paddle switch 116 is depressed, dictates the speed at which controller 402 regulates motor 112 during operation of sander 100. Switch 114 may illustratively have an on/off control-level signal, such as may illustratively be provided by a micro-switch, which can be interfaced directly to controller 402. Also, a non-contact type of switch can be used, such as logic switch/transistor/FET, optical switch, or a Hall Effect sensor—magnet combination. It should be understood that switch 114 could be a mains switch that switches power on and off to sander 100, or at least to semiconductors Q1-Q6.

Illustratively, three position sensors 308 are used to provide position information of rotor 200 to controller 402 which controller 402 uses to determine the electronic commutation of motor 112. It should be understood, however, that two or one positions sensors 308 could be used, or a sensor-less control scheme used. Speed information may illustratively be obtained from these position signals in conventional fashion.

Sander 100 may illustratively include a sensor, such as a pressure sensor 408, that senses when sander 100 is removed from the work piece, such as by sensing a decrease in pressure on platen 108. A force sensor such as a strain gauge type of force sensor may alternatively or additionally be used. Based on the signal from pressure sensor 408 crossing a threshold value, controller 402 transitions from an "idle speed" mode where it regulates the speed of motor 112 at an idle speed to a "sanding speed" mode where it regulates the speed of motor 112 based on the position of speed potentiometer 406, and vice-versa. Thus, when sander 100 is applied to the work piece, controller 402 will transition to the "sanding speed" mode and when sander 100 is removed from the work piece, controller 402 will transition to the "idle speed" mode.

Alternatively, speed information determined from one or more of position sensors 308 and/or motor current determined from a current sensor 410 can be used by controller 402 to determine when to transition between the "idle speed" mode and the "sanding speed" mode. In an open loop control, the speed of the motor drops with load and the motor current increases with load for a given PWM duty cycle. Applying the sander to the work piece as it is running increases the load on the motor and decreases the motor speed. By determining the motor 112 speed and/or current at the idle speed PWM duty cycle, it can be determined whether sander 100 is being loaded or not. Based on the deviations of the motor 112 speed and/or current from a range of typical values when the motor 112 is running unloaded at idle speed, controller 402 can determine that sander 100 has been applied to the work piece and thus transition from the "idle speed" mode to the "sanding speed" mode. Similarly, based on the deviations of the motor 112 speed and/or current from a range of typical values when the motor 112 is running loaded, controller 402 can determine that sander 100 has been lifted from the work piece and thus transition from the "sanding speed" mode to the "idle speed" mode. The foregoing is described in more detail in U.S. Pat. No. 7,318,768 for Low Profile Electric Sander issued Jan. 15, 2008, the entire disclosure of which is incorporated herein by reference.

In order to achieve the low profile nature of sander 100, it is important not only that motor 112 have the appropriate aspect ratio as discussed above, but also to minimize the effect that other components have on the height of sander 100. In this regard, with reference to FIG. 7, the windings 204 are wound to minimize the height of the end turns of windings 204. A position sense magnet 700 affixed to rotor 200 sensed by sensors 308 may illustratively be axial in orientation and made axially thin. Sensors 308 are mounted on a side of a printed circuit board 702 that faces position sense magnet 700 and the printed circuit board 702 illustratively located within 2.5 mm of the surface of position sense magnet 700. This permits sensor 308 when they are Hall Effect sensors to be properly activated by position sense magnet 700. To the extent possible, printed circuit board 702 is propagated with surface mount components to minimize the height of printed circuit board 702. Filter or smoothing capacitor 416, which filters or smoothes the output of rectifier 418, is mounted within housing 102 in an orientation so that it does not increase the height above printed circuit board 702.

Printed circuit board 702 includes a central hole 706 sized to permit a drive end bearing 708 to be passed through it during assembly. Rotor 200 may thus be sub-assembled by first placing drive end bearing 708 on it and rotor 200 then "dropped into" housing 102 in which printed circuit board 702 has previously been placed during assembly of sander 100.

Housing 102 includes a bearing pocket 710 in which an opposite drive end bearing 712 is received. Printed circuit board 702 may illustratively be disposed in housing 102 between opposite drive end bearing 712 and windings 204. In this event, printed circuit board 702 is disposed where the commutator and brushes in a brush motor, such as a universal motor, are typically disposed.

Cord 118 is brought in through an end cap of housing 102 and the wires in cord 118 connected to printed circuit board 702. Leads of windings 204 are brought up and connected to printed circuit board 702.

"Double insulation" as that term is commonly understood means that a device has basic and supplementary insulation, each of which is sufficient to prevent electrical shock. The internal electrical components are insulated by the double insulation from contact with any conductive part with which a user can come in contact. In this regard, compliance with double insulation requirements requires minimum spacings along non-insulated paths between live components and components that can become live if insulation fails and a conductive part that can be touched by a user. An example of a component that could become live in the event of an insulation failure is the lamination stack of stator 202 which could become live should the insulation on stator windings 204 fail. As used herein, "live" means that the component is electrically live.

Figure 8:
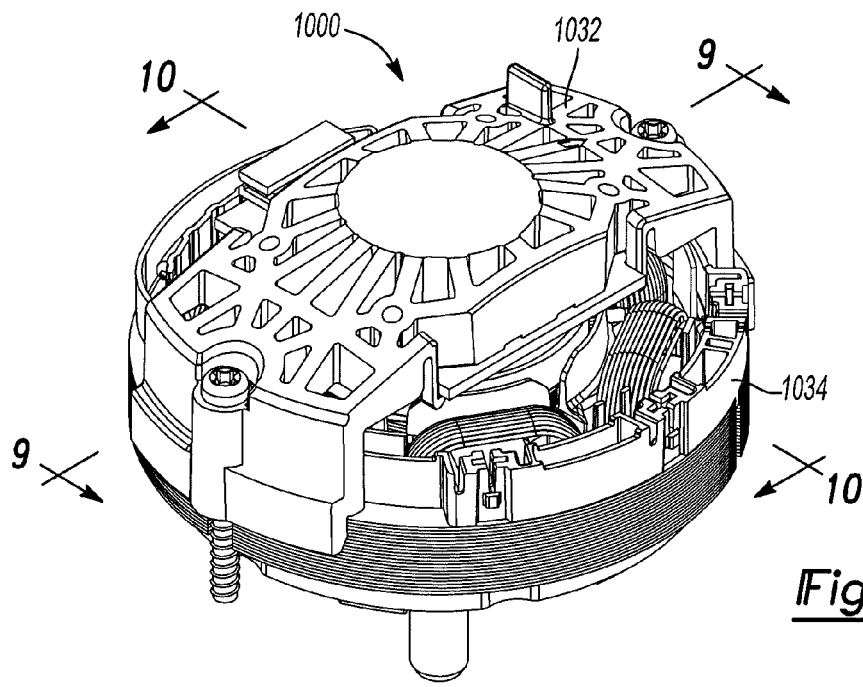
FIG. 8 is perspective view of a motor/bearing assembly having double insulation in accordance with an aspect of the present disclosure.
Figure 9:
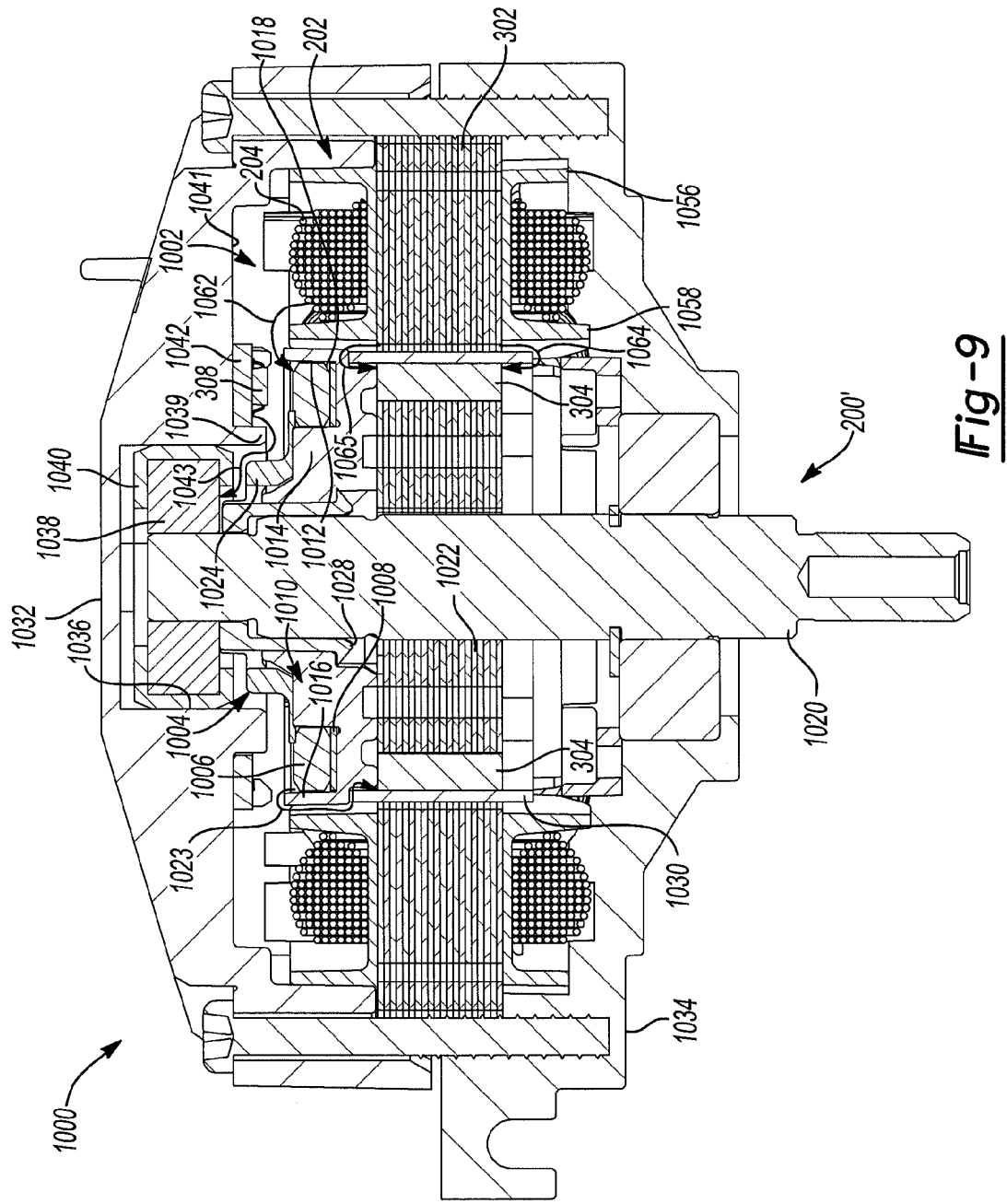
FIG. 9 is a cross-section view of the motor/bearing assembly of FIG. 8 taken along the line 9-9.
Figure 10:
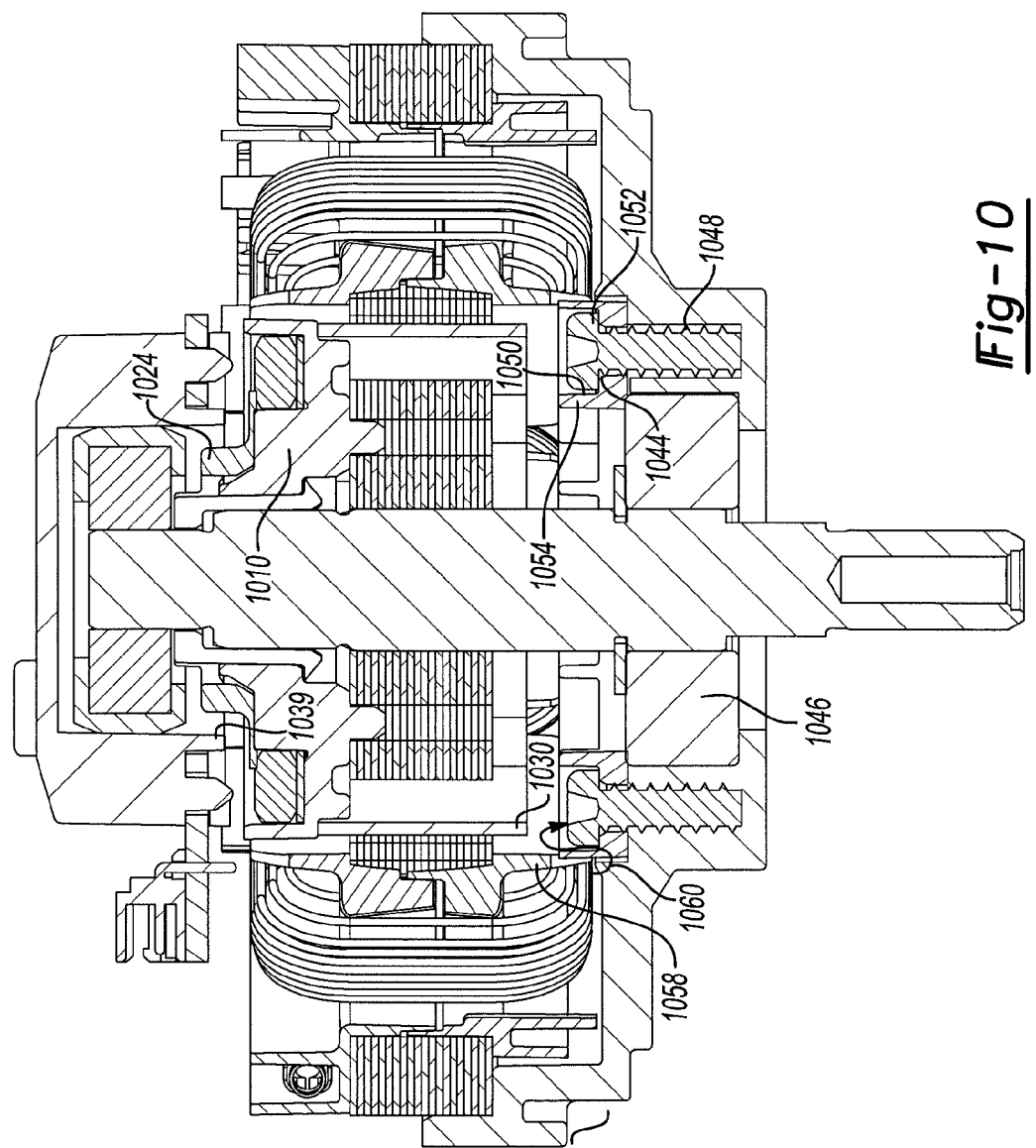
FIG. 10 is a cross-section view of the motor/bearing assembly of FIG. 8 taken along the line 10-10.

With reference to FIGS. 8-10, a motor/bearing assembly 1000 for a low profile power tool, such as low profile power tool 100, is shown. Again, the description is in the context of a low profile random orbital sander. It should be understood that the low profile power tool can be other types of power tools as discussed above.

Motor/bearing assembly 1000 has an electronically commutated motor 1002 and double insulation in accordance with an aspect of the present disclosure. Electronically commutated motor 1002 is similar to electronically commutated motor 112 described above with reference to FIGS. 3-7.

A sense magnet assembly 1004 is affixed to rotor 200' in proximity to sensors 308 and axially spaced therefrom. In an aspect, sense magnet assembly 1004 includes one or more sense magnets 1006, illustratively made of ferrite, a back yoke 1008 made of ferromagnetic material, illustratively steel, to boost the flux of the sense magnets 1006, and a sense magnet tray 1010 that holds the sense magnets 1006 and back yoke 1008. Sense magnet tray 1010 is illustratively an annular tray having a hole through which rotor shaft 1020 extends. Sense magnet tray 1010 is made of an electrically insulative materially, such as being molded of an electrically insulative plastic. Sense magnets 1006 may illustratively comprise a multi-pole ring magnet. In which case, sense magnet tray 1010 illustratively includes an annular receiving pocket 1012 that opens toward sensors 308 in which the steel ring that comprises back yoke 1008 and the ring magnet that comprises sense magnets are received, with back yoke 1008 received in a bottom of the receiving pocket 1012. The use of steel back yoke 1008 makes it possible to use lower cost ferrite sense magnets instead of a higher power sense magnets, such as bonded NdFeB (Neo), which are more expensive than ferrite magnets.

Sense magnet tray 1010 includes a generally annular main body 1014 having an upwardly (as oriented in FIG. 9) extending circumferential skirt 1016 that is disposed along radially outer edges 1018 of the sense magnets 1006 to insulate the sense magnets 1006 from stator 202.' In this regard, skirt 1016 has a height equal to or greater than a height of sense magnets 1006. Sense magnet tray 1010, being made of electrically insulative material, insulates sense magnets 1006 (which might become live should they contact sensors 308 or printed circuit board 1042 on which sensors 308 are mounted) from magnets 304, shaft 1020 and laminations 1022 of rotor 200.' This arrangement provides serpentine path 1023 that is the shortest uninsulated path between sense magnets 1006 and the closest electrically conductive part of rotor 200', in this case magnets 304. That is, the shortest uninsulated path from sense magnets 1006 to the closest conductive part of rotor 200' is along serpentine path 1023 that extends from sense magnets 1006, along an outer surface of annular skirt 1016, and along a bottom of sense magnet tray 1010. This serpentine path 1023 provides at least 8 mm of distance along the shortest uninsulated path, which is serpentine path 1023, between sense magnets 1006 and the closest conductive part of rotor 200.'

Figure 11:
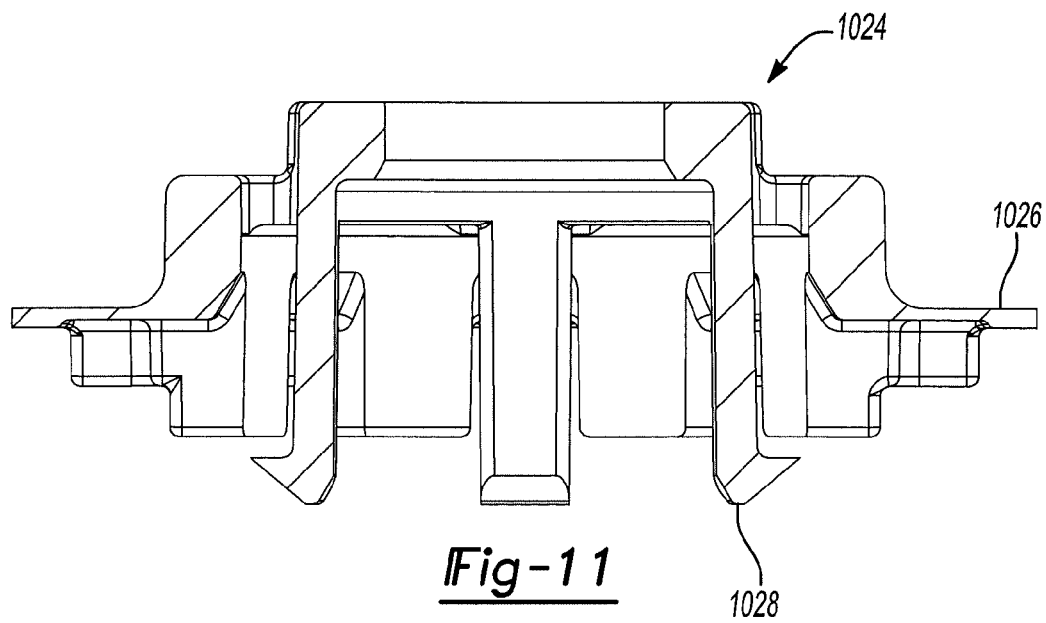
FIG. 11 is a perspective cross-section of a sense magnet retainer.
Figure 13:
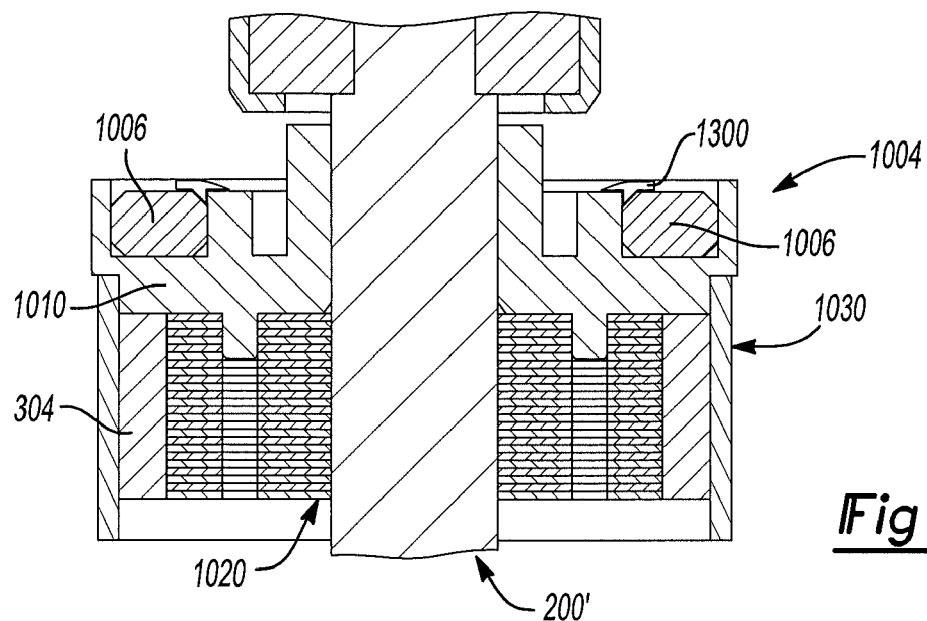
FIG. 13 is a cross-section of a variation of the motor/bearing assembly of FIG. 8.

To assemble sense magnet assembly 1004, sense magnet tray 1010 is pressed onto shaft 1020 of rotor 200. Back yoke 1008 is placed in annular receiving pocket 1012 and affixed in place, such as with glue. Sense magnets 1006 are placed in annular receiving pocket 1012 on top of back yoke 1008 and affixed therein, such as with glue. To provide secondary retention of sense magnets 1006 and back yoke 1008 in sense magnet tray 1010, an annular retainer 1024 is affixed to sense magnet tray 1010. As best shown in FIG. 11 annular retainer 1024 has a radially outward extending flange 1026 that extends over at least a portion of sense magnets 1006. Annular retainer 1024 illustratively has snaps 1028 that snap to sense magnet tray 1010 to hold annular retainer 1024 in place. In a variation, a rim 1300 is ultrasonically welded on sense magnet tray 1010 to provide the secondary retention instead of annular retainer 1024, as shown in FIG. 13.

To insulate magnets 304 and laminations 1022 of rotor 200' from surrounding live components or components that could become live, such as lamination stack 302 of stator 202,' an insulative sleeve 1030 is placed around magnets 304, with sleeve 1030 axially extending beyond axial ends of magnets 304. Illustratively, sleeve 1030 illustratively extends at least 1.85 mm beyond axial ends of magnets 304. Sleeve 1030 may illustratively be a glass-reinforced epoxy sleeve, such as a Polygon Tube® available from the Polygon Company of Walkerton, Ind. This provides serpentine paths 1064 & 1065 (FIG. 9) between lower and upper portions of the stator lamination stack 302 and the closest conductive parts of rotor 200,' illustratively permanent magnets 304. That is, the shortest uninsulated paths from lower and upper portions of stator lamination stack 302 and the closest conductive parts of rotor 200' are along serpentine paths 1064 & 1065 that extend around respective axial ends of sleeve 1030. These serpentine paths 1064 & 1065 provide at least 4 mm of distance along the shortest uninsulated path between stator lamination stack 302 and the closest conductive part of rotor 200.'

It should be understood that rotor 200' could have internal permanent magnets affixed in lamination stack 1022 instead of surface mounted permanent magnets 304 affixed to a periphery of lamination stack 1022. In which case, insulative sleeve 1030 would be placed around an outer periphery of lamination stack 1022 and the closest conductive parts of the rotor with respect to the upper and lower portions of stator lamination stack 302 would be lamination stack 1022 or rotor 200.'

Figure 12:
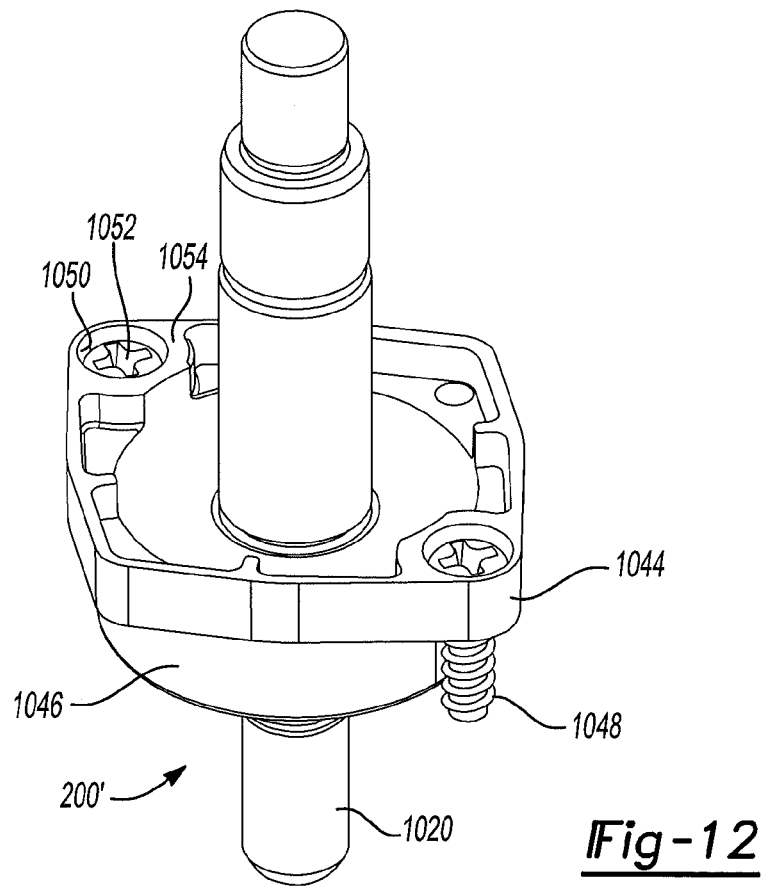
FIG. 12 is a perspective view of a lower bearing retainer, lower bearing and rotor shaft of the motor/bearing assembly of FIG. 8.

Motor/bearing assembly 1000 further includes an upper bearing bridge 1032 (as oriented in FIGS. 10-12) and a lower bearing bridge 1034 between which motor 1002 is disposed. Upper bearing bridge 1032 includes a central annular bearing pocket 1036 in which an upper bearing 1038 on rotor shaft 1020 is received. Upper bearing 1038 is pressed on rotor shaft 1020 toward an upper end thereof, illustratively, at the upper end of rotor shaft 1020. An insulative boot 1040, which may illustratively be molded of silicon rubber, is disposed around upper bearing 1038. A printed circuit board 1042 on which sensors 308 are mounted is affixed to a bottom surface 1041 of upper bearing bridge 1032. Upper bearing bridge 1032 also includes an annular skirt 1039 that extends downwardly (as oriented in FIGS. 9 & 10 from an outer periphery of bearing pocket 1036 toward sense magnet tray 1010 so that it extends at least 3.485 mm below a bottom of upper bearing 1038 when upper bearing 1038 is received in bearing pocket 1036. This arrangement provides a serpentine path 1043 that is the shortest uninsulated path from any live part of printed circuit board 1042 (or any component mounted thereon) to the outer race of upper bearing 1038. That is, the shortest uninsulated path from any live part of printed circuit board 1042 (or any component thereon) to the closest conductive part of rotor 200' is along serpentine path 1043 that extends from printed circuit board 1042 (or the appropriate component thereon) along an outer surface of annular skirt 1039. This serpentine path 1043 provides at least 8 mm of distance along the shortest uninsulated path, which is serpentine path 1043, between the outer race of upper bearing 1038 and any live trace of printed circuit board 1042.

Lower bearing bridge 1034 includes a bearing retainer 1044 (FIG. 10) in which a lower bearing 1046 is received. Lower bearing 1046 is illustratively pressed on rotor shaft 1020 toward a lower end thereof. Bearing retainer 1044 is made of electrically insulative material, such as being molded of electrically insulative plastic. Bearing retainer 1044 is affixed to lower bearing bridge 1034 by screws 1048 (FIG. 12) that are received in screw pockets 1050 so that heads 1052 of screws 1048 are at least 0.6 mm below a top surface 1054 of bearing retainer 1044.

Stator 202' includes electrical insulation 1056 (FIG. 9) disposed around surfaces of stator lamination stack 302 adjacent to stator windings 204 which includes insulative shields 1058 at radially inner edges of stator windings 204. Insulative shields 1058 extend above and below top and bottom edges of stator windings 204 at least 0.5 mm. Electrical insulation 1056 may illustratively be a component molded of an electrically insulative plastic.

The insulative shields 1058 and the recessing of screw heads 1052 of screws 1048 in screw pockets 1050 of bearing retainer 1044 provide a serpentine path 1060 (FIG. 10) between the bottom of stator windings 204 and screw heads 1052. That is, the shortest uninsulated path from a stator winding 204 and a screw head 1052 is along serpentine path 1060 that extends along an outer surface of an insulative shield from stator winding 204 to a screw head 1052. This serpentine path 1060 provides at least 6 mm of distance along the shortest uninsulated path between stator windings 204 and screws 1048.

Sleeve 1030 and insulative shields 1058 provide a serpentine path 1062 between stator windings 204 and magnets 304 which are the closest conductive part of rotor 200,' illustratively magnets 304, to stator windings 204. That is, the shortest uninsulated path from a stator winding 204 and the closest conductive part of rotor 200' is along serpentine path 1062 that extends along an outer surface of an insulative shield 1058 from a stator winding to the closest conductive part of rotor 200,' illustratively magnets 304. This serpentine path 1062 provides at least 6 mm of distance along the shortest uninsulated path between stator windings 204 and magnets 304.

The insulative shields 1058 and circumferential skirt 1016 of sense magnet tray 1010 provide a serpentine path 1062 (FIG. 9) between stator windings 204 and sense magnets 1006. That is, the shortest uninsulated path from stator windings 204 to sense magnets 1006 is along serpentine path 1062 that extends along an outer surface of an insulative shield and around an axial end of the circumferential skirt 1016 from a stator winding 204 to a sense magnet 1006. This serpentine path 1062 provides at least 4 mm of distance along the shortest uninsulated path between stator windings 204 and sense magnets 1006.

Figure 14:
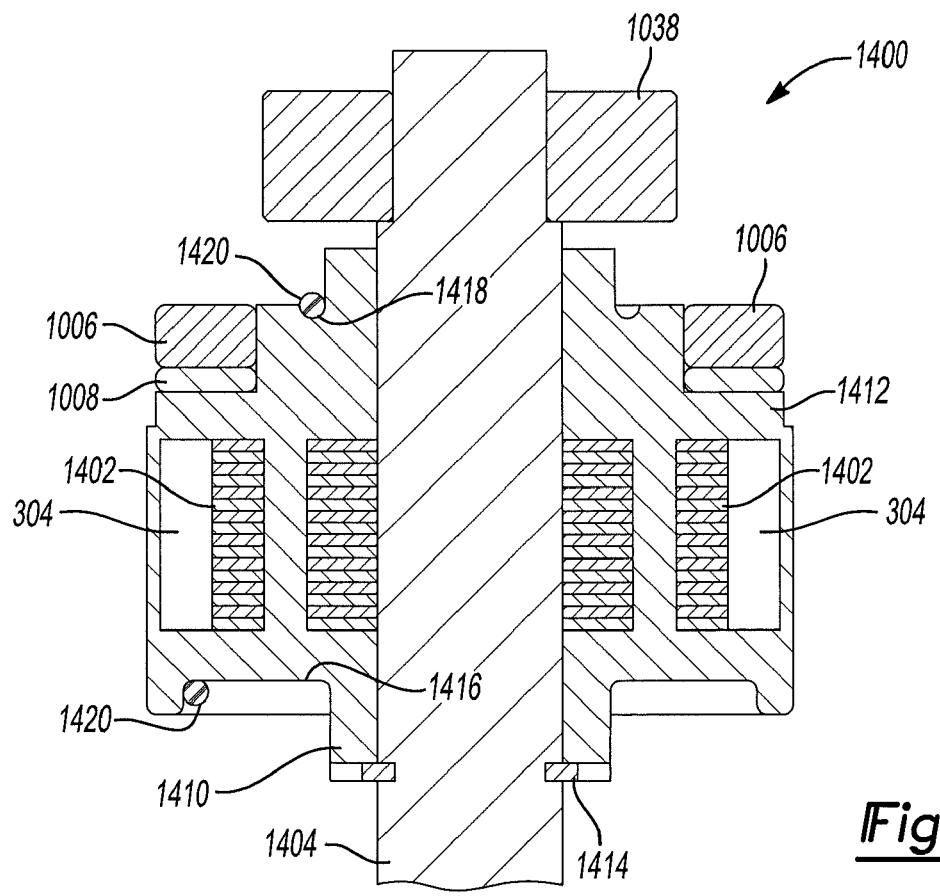
FIG. 14 is a cross-section of an overmolded rotor in accordance with an aspect of the present disclosure.

With reference to FIG. 14, a variation 1400 of rotor 200' of motor/bearing assembly 1000 is described. Rotor 1400 includes a stack of laminations 1402 made of loose steel laminations is pressed on rotor shaft 1404. Magnets 304 are then placed on lamination stack 1402 forming a rotor sub-assembly. The rotor sub-assembly is then placed in a mold and overmolded with a material, which in an aspect is a thermoplastic or a thermoset, to form overmold 1410. A sense magnet tray 1412 is molded when the overmold material is molded and includes molded features to locate sense magnet back yoke 1008. The sense magnet back yoke 1008 is placed in the sense magnet tray and affixed in place, such as with glue. Sense magnets 1006 are then placed on sense magnet back yoke 1008 and affixed in place, such as described above. Upper bearing 1038 is pressed on rotor shaft 1304.

Overmolding rotor 1400 simplifies the assembly of rotor 1300 and reduces the need for certain parts, such as the E-clip that typically provides a lower shoulder on the rotor shaft. Lower shoulder 1414 is molded when the overmold material is molded to form overmold 1410 as are features 1416, 1418 that provide locations for placement of balancing putty 1420. Using an electrically insulative thermoplastic or thermoset for the material of which overmold 1410 is formed facilitates making the motor in which rotor 1400 is used double insulated.

By overmolding rotor 1400, magnets 304 need not be glued to lamination stack 1402 as magnets 304 are retained by the overmold 1410. The structure of rotor 1400 is simple, robust and less susceptible to failure due to high centrifugal forces.

Figure 15:
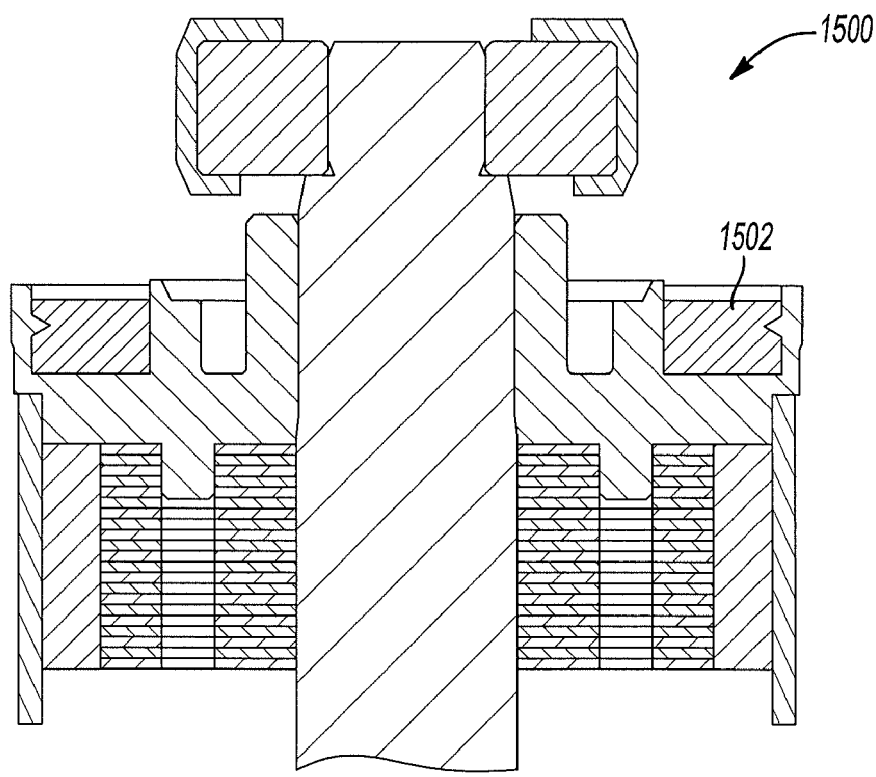
FIG. 15 is a cross-section of a rotor having molded sense magnets molded in accordance with an aspect of the present disclosure.
Figure 16:
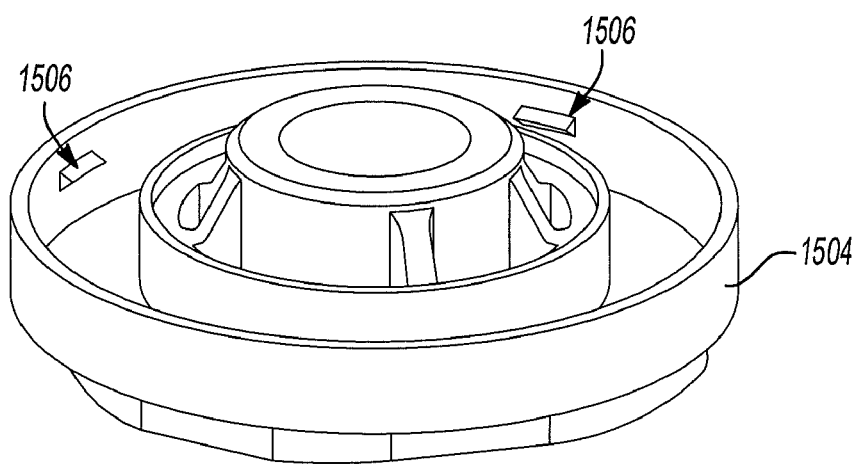
FIG. 16 is a perspective view of a sense magnet tray of the rotor of FIG. 15.

With reference to FIG. 15, a variation 1500 of rotor 200'of motor/bearing assembly 1000 is described. Rotor 1500 without the sense magnets is placed in a mold. Sense magnets 1502 are molded and injection bonded in sense magnet sense tray 1504. Illustratively, sense magnets 1502 are molded of a bonded NdFeB type material with a resin filler, eliminating the need for a ferromagnetic back yoke, which is not used. Sense magnet tray 1504 illustratively is formed to include features 1506 (FIG. 16) that axially retain sense magnets 1502. This process simplifies assembly as it minimizes the handling of parts. The sense magnet assembly includes few parts, illustratively two, sense magnet tray 1504 and sense magnets 1502.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power tool, comprising:
    a housing having an electronically commutated motor disposed therein;
    the motor having a rotor and a stator, the rotor having permanent magnets, the stator having a lamination stack and windings wound therein;
    the rotor having a shaft, a sense magnet tray affixed to the shaft of the rotor in proximity to a sensor disposed in the housing, the sensor axially spaced from the sense magnet tray, a sense magnet affixed to the sense magnet tray, the sense magnet tray having a circumferential skirt that extends around an outer edge of the sense magnet, the skirt having a height at least equal to a height of the sense magnet;
    wherein a shortest uninsulated path between the sense magnet and a closest conductive part of the rotor is along a serpentine path that runs from the sense magnet, along an outer surface of the circumferential skirt and along a bottom of the sense magnet tray.

2. The apparatus of claim 1 wherein the sense magnet includes a multi-pole ring magnet.

3. The apparatus of claim 1 wherein the sense magnet includes a plurality of magnets.

4. The apparatus of claim 1 including a yoke of ferromagnetic material disposed in the sense tray, the sense magnet disposed on top of the yoke, the sense magnet made of ferrite.

5. The apparatus of claim 1 wherein the sense magnet is affixed to the sense magnet tray by glue and by a retainer.

6. The apparatus of claim 5 wherein the retainer has snaps that snap to the sense magnet tray to affix the retainer to the sense magnet tray.

7. The apparatus of claim 1 wherein the sense magnets are affixed to the sense magnet tray by glue and by a rim ultrasonically welded to the sense magnet tray.

8. The apparatus of claim 1 wherein the rotor includes an electrically insulative sleeve disposed around a periphery of the rotor, the sleeve having opposed axial ends that extend beyond respective opposed axial ends of the permanent magnets, wherein shortest uninsulated paths between upper and lower portions of the stator lamination stack and respective closest conductive parts of the rotor are around axial ends of the insulative sleeve.

9. The apparatus of claim 1 including an upper bearing bridge extending across a top of the stator, the bearing bridge having a bearing pocket in which an upper bearing on the rotor shaft is received, the upper bearing bridge including an annular skirt made of electrically insulative material that extends from a periphery of the bearing pocket toward the sense magnet tray, wherein a shortest uninsulated path between any live component of a circuit board on which the sensor is mounted and the upper bearing is along a serpentine path that extends from the circuit board along an outer surface of the annular skirt.

10. The apparatus of claim 9 including a boot made of electrically insulative material disposed around the upper bearing.

11. The apparatus of claim 1 including electrically insulative shields disposed at radially inner sides of the stator windings that have opposed axial ends that extend beyond respective opposed axial ends of the stator windings, a lower bearing bridge including a lower bearing retainer made of an electrically insulative material, the lower bearing retainer affixed to the lower bearing bridge by at least one screw extending through a screw hole in the lower bearing bridge wherein a head of the screw is recessed in a screw pocket in the lower bearing bridge with a top surface of the screw head below a top surface of the upper bearing bridge, wherein a shortest uninsulated path from any stator winding to the screw head is along a serpentine path along an outer surface of one of the insulative shields, the top surface of the lower bearing retainer and into the screw pocket.

12. The apparatus of claim 11 wherein a shortest uninsulated path from a stator winding to the sense magnet is along a serpentine path along an outer surface of one of the insulative shields and around an axial end of the circumferential skirt.

13. The apparatus of claim 1 wherein the power tool is a low profile sander having a maximum height of 120 mm.

14. A power tool, comprising:
    a housing having an electronically commutated motor disposed therein;
    the motor having a rotor and a stator, the rotor having permanent magnets, the stator having a lamination stack and windings wound therein;
    the rotor having a shaft, a sense magnet tray affixed to the shaft of the rotor in proximity to a sensor disposed in the housing, the sensor axially spaced from the sense magnet tray, a sense magnet affixed to the sense magnet tray, the sense magnet tray having a circumferential skirt that extends around an outer edge of the sense magnet, the sense magnet tray circumferential skirt having a height at least equal to a height of the sense magnet;
    wherein a shortest uninsulated path between the sense magnet and a closest conductive part of the rotor is along a serpentine path that runs from the sense magnet, along an outer side of the sense magnet tray circumferential skirt and along a bottom of the sense magnet tray;
    an upper bearing bridge extending across a top of the stator, the bearing bridge having a bearing pocket in which an upper bearing on the rotor shaft is received, the upper bearing bridge including an annular skirt made of electrically insulative material that extends from a periphery of the bearing pocket toward the sense magnet tray, wherein a shortest uninsulated path between any live component of a circuit board on which the sensor is mounted and the upper bearing is along a serpentine path that extends from the circuit board along an outer surface of the annular skirt;
    the rotor including an electrically insulative sleeve disposed around the permanent magnets, the sleeve having opposed axial ends that extend beyond respective opposed axial ends of the permanent magnets, wherein shortest uninsulated paths between upper and lower portions of the stator lamination stack and respective closest conductive parts of the rotor are around axial ends of the insulative sleeve;
    electrically insulative shields disposed at radially inner sides of the stator windings that have opposed axial ends that extend beyond respective opposed axial ends of the stator windings;
    a lower bearing bridge including a lower bearing retainer made of an electrically insulative material, the lower bearing retainer affixed to the lower bearing bridge by at least one screw extending through a screw hole in the lower bearing bridge wherein a head of the screw is recessed in a screw pocket in the lower bearing bridge with a top surface of the screw head below a top surface of the upper bearing bridge, wherein a shortest uninsulated path from the stator windings to the screw head is along a serpentine path along an outer surface of one of the insulative shields, the top surface of the lower bearing retainer and into the screw pocket; and wherein a shortest uninsulated path from a stator winding to the sense magnet is along a serpentine path along an outer surface of one of the insulative shield and around an axial end of the circumferential skirt.

15. The apparatus of claim 14 wherein the power tool is a low profile sander having a maximum height of 120 mm.

* * * * *